INVENTORS
GEORGE L. HELLER
FRANK J. ECKERT
CHARLES L. DE LAND
ROBERT W. DINGMAN
BY J Richard Geaman

ATTORNEY

United States Patent Office 3,787,562
Patented Jan. 22, 1974

3,787,562
CARBON BLACKS HAVING IMPROVED DISPERSION AND PLATEWEAR CHARACTERISTICS
George L. Heller, Monroe, La., Frank J. Eckert, Morrisville, Pa., and Charles L. De Land, West Monroe, and Robert W. Dingman, Monroe, La., assignors to Cities Service Company, New York, N.Y.
Original application Jan. 2, 1969, Ser. No. 788,491, now Patent No. 3,642,446. Divided and this application May 14, 1971, Ser. No. 143,610
Int. Cl. C09c 1/48, 1/50
U.S. Cl. 423—445
2 Claims

ABSTRACT OF THE DISCLOSURE

A reaction mixture is formed of a feedstock hydrocarbon and hot combustion gases, the mixture having a composition and sufficient heat content for formation of a carbon black of specific particle size and structure characteristics upon decomposition of the hydrocarbon within the mixture. Before the carbon black is completely formed, the mixture is diluted with a gas which is substantially nonreactive with the carbon black and cooler than the mixture. Agglomeration of the particles of carbon black within the mixture is reduced, and the resultant dispersion and platewear characteristics of the carbon black in printing inks are greatly improved.

This application is a division of U.S. application Ser. No. 788,491, filed on Jan. 2, 1969, now U.S. Pat. 3,642,446.

BACKGROUND OF THE INVENTION

Field of the invention

This invention relates to carbon blacks which are employed as pigments in rubber, paints, lacquers, and plastics, and more particularly to carbon blacks which are used as pigments in printing inks.

Description of the prior art

For many years carbon black was manufactured chiefly by channel processes in which a gaseous hydrocarbon such as natural gas was partially burned and the resulting carbon black was collected by impingement upon a cold surface. Oil furnace processes, which employ normally liquid hydrocarbons as feedstocks for the carbon black, were subsequently developed and currently permit the manufacture of carbon black at much higher rates, and in a greater variety of grades, at lower process cost.

Great quantities of oil furnace black are used each year as reinforcing pigments for rubber. They are also employed as pigments in inks, paints and the like, but have been used to only a limited extent as a pigment in printing inks. In the printing ink field, oil furnace blacks have been unable to displace channel blacks since the former disperse poorly in ink vehicles and the resulting inks wear down the printing plates at too high a rate.

Ink makers prefer a carbon black which can be easily and thoroughly dispersed in the ink vehicle. Inadequate dispersion of the carbon black in the ink can result in the filling of recesses and depressions of the printing plate and cause blurring and smudging of the printed image. Heretofore, oil furnace blacks have been characterized by a high content of microscopic agglomerates of the particles, and in order to provide a good dispersion in printing ink the particles in the agglomerates must be dispersed, either chemically or by application of an extraordinary amount of mechanical work. Such additional processing is, however, objectionable and costly to the ink maker.

Abrasiveness of an ink refers to the rate at which it will wear away the printing plate surface during the printing operation. While the term "abrasiveness" is used to describe a property of the ink, it carries simultaneously a similar connotation for the ink pigment itself since the abrasive character of the ink is attributed primarily to the pigment contained within it. Thus, a carbon black may be described as either a high or low abrasion product, and will generally be referred to as being either high or low in "platewear." Platewear is of vital interest to the long-run printing operations where thousands of copies of a print are made. Use of a highly abrasive black in the ink can result in platewear rates so high as to require premature shutdown of the printing operation. Loss in operating time and replacement of plates are very costly to the printer.

Oil furnace blacks, although cheaper in price and more readily available than channel blacks, have nonetheless failed to meet the standards of dispersion and platewear achieved with channel blacks. Poor dispersion in printing ink, relative to channel black, has been the general rule for oil furnace blacks. Platewear values of 100–300% worse are normally observed when testing an oil furnace black for this property against a channel black at equal color and viscosity.

Numerous methods of after-treatment have been proposed for improving the disperson and platewear characteristics of oil furnace blacks in printing inks, including the addition of dispersing agents to the ink vehicle and/or the pigment itself, the addition of a compatible oil to the black before it is mixed into the vehicle, and mechanical treatment for reduction of agglomerate size, such as pulverization, fluid energy milling and prolonged milling of the ink mix. All of these methods intend, however, to resolve difficulties which arise due to the presence of the agglomerates in the black, and no method has heretofore been proposed which would negate or greatly reduce the occurrence of the agglomerates in the first place.

SUMMARY OF THE INVENTION

It is therefore an object of this invention to reduce agglomeration of the carbon black during formation of the particles.

Another object is to provide a carbon black which can be produced directly in a furnace and which without after-treatment is characterized by outstanding dispersion and low platewear characteristics in printing inks.

Still another object is to produce oil furnace blacks which can be employed as a replacement for channel blacks in printing inks.

These and other objects of the invention will become apparent from the following description and the appended claims.

In carrying out the present invention, the first step is formation of a reaction mixture of a feedstock hydrocarbon and hot combustion gases, the gases being the product of burning a fluid fuel with a free oxygen-containing gas. The composition and heat content of the mixture are such that a carbon black of specific particle size and structure characteristics is formed upon thermal decomposition of the hydrocarbon by absorption of heat from the hot combustion gases of the mixture. Thermal decomposition of the hydrocarbon within the mixture is allowed to proceed until the desired particle size and structure characteristics of the carbon black have substantially developed, and the reaction mixture is then diluted with a diluent gas which is substantially nonreactive with the black and cooler than the mixture. However, the reaction mixture is not chilled with the diluent gas to the extent that continued thermal decomposition of the hydrocarbon is completely terminated, but reaction conditions are nonetheless altered by the dilution so that high temperature agglomeration of the particles is greatly reduced.

Although not wishing to be bound by theory, it is felt that the particles tend to agglomerate in the formation zone due to their small particle size and high surface energy after the desired particle size and structure characteristics of the particles are substantially developed. Dilution reduces the temperature of the reaction mixture below that at which rapid decomposition of residual hydrocarbon would tend to bind the particles together in a weak or "secondary" structure unit that resists dispersion and causes excessive platewear.

Initially, therefore, the reaction mixture will have a heat content sufficient for forming the desired particle size and structure characteristics of the black, and the diluent gas will be somewhat cooler when passed into the mixture. For example, the reaction mixture should be at a temperature in excess of 2200° F. when forming the particles, and the diluent gas can be at a temperature of about 2100° F. to about 1400° F., and passed into the mixture at the rate of at least about 0.5 cubic foot per cubic foot of the mixture. However, it will be understood that the diluent gas can be still cooler, in which case smaller amounts are required for the dilution.

The diluent gas can be the hot combustion products of burning a fluid fuel with a free oxygen-containing gas and wherein the oxygen content has been substantially depleted so that the yield and quality of carbon black is not adversely affected to any serious extent by reaction with excess oxygen. To additional advantage, the diluent gas may comprise the gaseous products resulting from the thermal decomposition of a hydrocarbon to form carbon black, e.g. flue gases from which a carbon black product is separated and which are then normally wasted or burned as a fuel. Accordingly, the diluent gas can be the gaseous products which result from thermal decomposition of hydrocarbon within the aforesaid mixture, the gases being recirculated and introduced into the mixture during reaction of the feedstock hydrocarbon therein. The recirculation can be effected externally of the chamber within which the carbon black is formed, before or after the carbon black is separated from the gases, but more advantageously within the chamber and prior to separation of the carbon black. Thus, a continuously supplied mixture can be reacted to form an aerosol of carbon black in the hot combustion gases and the gaseous products of thermal decomposition of the hydrocarbon, and at least a portion of the aerosol can be recirculated and introduced into the reaction mixture during formation of the carbon black within the chamber.

The invention can be applied to well known oil furnace black processes wherein the reaction mixture is forcefully injected into an elongated carbon black formation zone and very quickly reacted therein the develop the desired particle size and structure characteristics of the black. Normally, a highly aromatic, high molecular weight hydrocarbon, such as a petroleum residue or creosote oil, is employed as the feedstock for the carbon black, and in order to form a reaction mixture these feedstocks may be forcefully injected into the hot combustion gases as an atomized spray of liquid droplets. An additive, such as an alkali metal compound, may be introduced into the reaction mixture for controlling the structure characteristics of the resultant black. The mixture is forcefully injected into the carbon black formation zone of the furnace to achieve a high degree of turbulence and rapid reaction so that the particle size and structure characteristics of the black are quickly established prior to significant expansion and/or dilution of the mixture. To particular advantage, the reaction mixture can be injected into the carbon black formation zone as an elongated, substantially columnar mass having a significantly smaller cross sectional area than the formation zone. Accordingly, a columnar mass of the mixture having a cross sectional area not exceeding about one-sixteenth the cross sectional area of the formation zone can be injected into the zone at a velocity in excess of about 400 feet per second and more advantageously within the range of about 600 to about 1400 feet per second. The expression "substantially columnar mass" may be taken to mean that the reaction mixture is injected into the carbon black formation zone as a mass which may diverge to some extent but which does not quickly expand outward to fill the cross section of the zone. Columnar projection of the mass may be accomplished by directing the flow of the mixture substantially in-line with regard to the projection axis of the mass, rather than causing the mixture to spiral.

By projecting the reaction mixture axially into the elongated formation zone under the above-prescribed conditions, dilution of the mixture can be effected more or less automatically, i.e. a portion of the aerosol which is created within the formation zone, by thermal decomposition of the feedstock, is inspired into the mixture by means of Bernoulli's effect. Accordingly, the mixture is projected into the carbon black formation zone and the feedstock hydrocarbon is thermally decomposed therein to form an aerosol of the carbon black suspended in the hot combustion gases and the gases produced by thermal decomposition of the hydrocarbon. A region of lower pressure exists around the reaction mixture being introduced into the formation zone, and a portion of the aerosol is thus drawn back into this region and is then inspired into the mixture being introduced into the formation zone. Thus, the aerosol which enters and dilutes the mixture flows countercurrently around the columnar mass and then concurrently and into the reaction mixture. Since the aerosol which passes into the mixture should be measurably cooler than the mixture itself, a cooling agent, such as water vapor, may be introduced into the aerosol beforehand. After the carbon black has been completely formed, the aerosol is withdrawn from the formation zone and the carbon black is recovered. The columnar mass of reaction mixture can be projected substantially longitudinally into one end of the elongated carbon black formation zone while the carbon black aerosol is removed from the other end. To particular advantage the formation zone may be vertically elongated, with the columnar mass of reaction mixture being projected upwardly into the lower end of the zone while the aerosol is removed from the upper end thereof.

As previously indicated, the cross sectional area of the carbon black formation zone should be at least about 16 times greater than the cross sectional area of the columnar mass of reaction mixture as it enters the formation zone, but more advantageously the cross sectional area of the formation zone should be from about 36 to about 400 times greater than the cross sectional area of the columnar mass.

The hot gases for forming the mixture may be produced within a combustion chamber into which a mixture of a fluid fuel and a free oxygen-containing gas is continuously introduced and burned. The hot combustion gases may then be discharged into an elongated reaction chamber through a restricting orifice aligned substantially axially with respect to the reaction chamber. Both the combustion chamber and the restricting orifice should be adapted for substantially in-line discharge of said gases from the orifice into the reaction chamber, and the reaction chamber should have a cross-sectional area of at least about 16 times that of the orifice.

In accordance with the present invention, novel carbon blacks can be produced. Oil furnace blacks can be manufactured by direct production which have a surface mean particle diameter within the range of about 150 to about 650 angstroms, a dibutylphthalate absorption within the range of about 40 to about 80 cc. per 100 grams and an agglomerate area below about 500 square microns per square millimeter, and more particularly within the range of about 30 to 300 square microns per square millimeter.

Furthermore, carbon blacks can be manufactured by direct production in accordane with the invention which have surface mean particle diameter and dibutylphthalate absorption within the ranges just stated while also having an $L_c$ crystallite dimension in excess of 15.5 angstroms, and more particularly from 16.0 to 18.0 angstroms. The term "manufactured by direct production" may be taken to mean carbon blacks which are recovered and usable directly after formation without additional after treatment such as pulverization, fluid energy milling, graphitization or the like.

DESCRIPTION OF THE PREFERRED EMBODIMENTS

Figure 1:
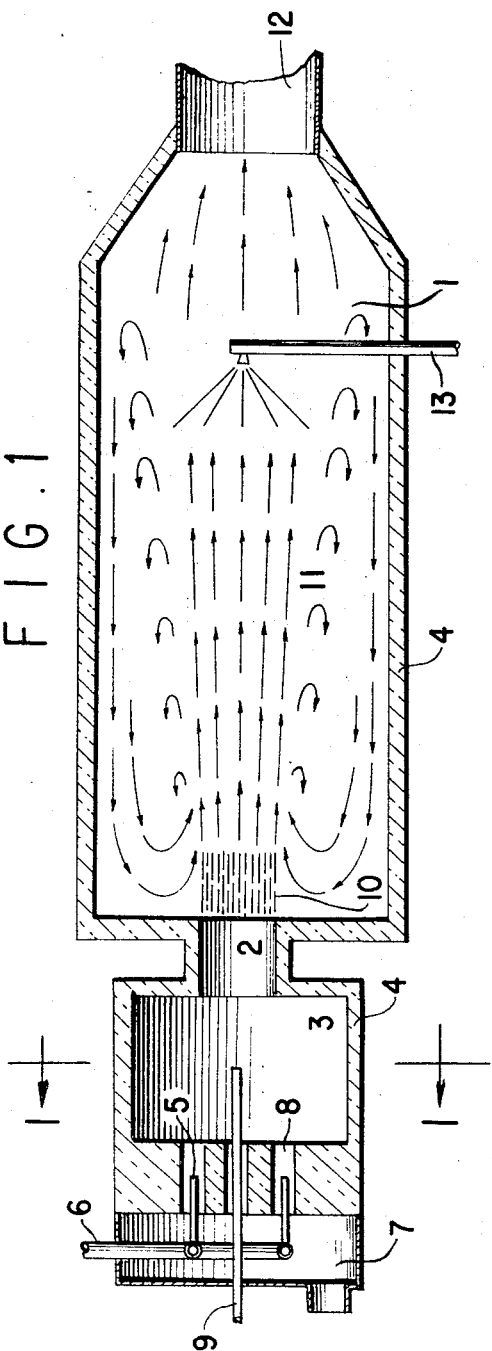
FIG. 1 is a horizontal sectional view of a carbon black furnace which may be employed in carrying out the invention, said furnace which may be employed in carrying out the invention, said furnace having an in-line blast combustion chamber connected coaxially with an elongated reaction chamber through a restricting orifice, or choke.

In FIG. 1, an elongated carbon black formation zone 1, a restricting orifice or choke 2, and a combustion chamber 3 are bounded by an insulating refractory wall 4. A fluid fuel, such as natural gas, is introduced into the combustion chamber through jets 5 from a fuel supply header 6. A free oxygen-containing gas, such as air, is passed into a bustle 7 and subsequently flows into the blast ports 8. A mixture of the fluid fuel and the free oxygen-containing gas forms in the blast ports and burns within the combustion chamber 3 to form hot combustion gases. A feedstock hydrocarbon, such as a petroleum residue or creosote oil is injected as an atomized spray of droplets into the hot combustion gases within chamber 3 through a sprayer 9. The feedstock hydrocarbon and the hot combustion gases are thus formed into a reaction mixture which is passed through the choke 2 into the carbon black formation zone 1. The feedstock hydrocarbon which is injected into the furnace may contain a structure control additive such as an alkali metal compound, e.g. potassium or sodium chloride or hydroxide.

The reaction mixture of hot combustion gases and the feedstock hydrocarbon is thus forcefully projected through the choke 2 into the carbon black formation zone 1 as a substantially columnar mass 10. The feedstock hydrocarbon is thermally decomposed by heat absorbed from the hot gases to produce an aerosol 11 of carbon black suspended in the combustion gases and the gases produced by the thermal decomposition. After the carbon black is completely formed it is removed from the carbon black formation zone through an outlet 12.

Projection of the reaction mixture into the chamber 1 creates a Bernoulli effect which causes circulation of the aerosol from the downstream end of the formation zone back toward the columnar mass 10, as indicated by the arrows. The aerosol is thus caused to flow countercurrently with respect to the columnar mass and then concurrently and into mixture therewith shortly after entry of the mass into the formation zone. For controlling the temperature of the aerosol, and thus the temperature of the gas which enters the mixture and dilutes it, water is injected into the formation zone through a spray 13.

The reaction mixture is formed having whatever proportions of feedstock hydrocarbon, hot combustion gases, additives and the like as may be desired by the operator for making a particular type of carbon black. The necessary proportions and compositions for each type are well known to the skilled artisan.

The point at which the feedstock hydrocarbon is injected into the hot combustion gases by means of the sprayer 9 is somewhat variable, one advantageous sprayer position being shown in FIG. 1. However, the tip of the sprayer may be located closer to the choke 2, within it, or even beyond it, and still produce a suitable reaction mixture. Accordingly, the feedstock hydrocarbon may be partially decomposed into carbon black within the combustion chamber and choke or entirely within the carbon black formation zone 1.

Figure 3:
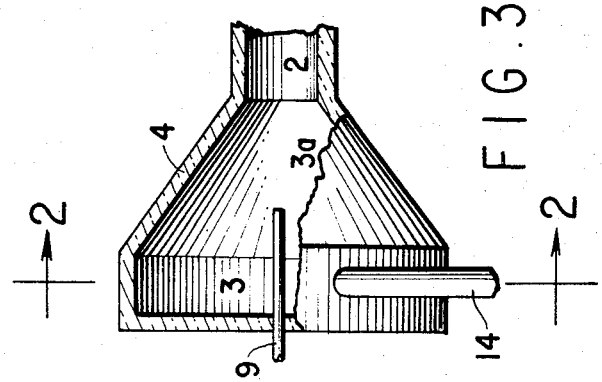
FIG. 3 is a horizontal sectional view of a tangential blast combustion chamber which may be employed with the furnace of FIG. 1.
Figure 2:
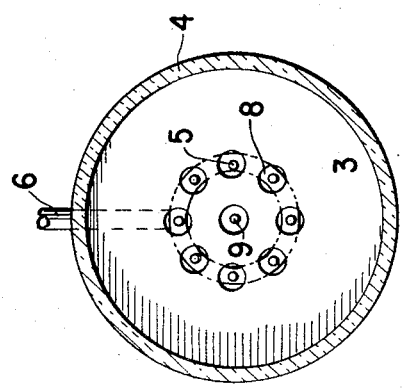
FIG. 2 is a vertical sectional view of the combustion chamber of FIG. 1 along the line 1—1 of FIG. 1.

An alternate type of combustion chamber which may be employed with the furnace of FIG. 1 is shown in FIG. 3. Air is introduced tangentially into the chamber 3 through conduit 14. Fuel gas is injected coaxially into conduit 14 through a jet 15. The resultant mixture is burned in chamber 3 to produce a spiraling mass of hot combustion gases which are conveyed to the choke 2 through a frusto-conical section 3a of the chamber. It must be pointed out, however, that the angle of the frusto-conical section, the diameter of choke 2 and the rate at which the reaction mixture is passed into the choke must be such that the flow of the mixture out of the choke must be such that the flow of the mixture out of the choke and into the carbon black formation zone is substantially in-line rather than spiraling, since the mixture should enter the formation zone as a substantially columnar mass rather than as an expanding cone.

As previously indicated the carbon black formation zone 1 should have a cross sectional area at least about 16 times greater than the choke and preferably 36 to 400 times as great. Furthermore the reaction mixture should be discharged from the choke at a velocity in excess of about 400 feet per second, and more advantageously within the range of about 600 to about 1400 feet per second. The heat content of the reaction mixture should be sufficient to effect a reaction temperature of at least about 2200° F. within the columnar mass prior to introduction of the aerosol as a diluent, and the aerosol should be cooled to a temperature of about 2100° F. to about 1400° F. before it is inspired into the mixture.

The carbon black formation zone can, to advantage, be vertically disposed since circulation of the aerosol within the furnace is thereby enhanced. The length of the formation zone is not critical, except that it should be sufficiently long to accommodate the length of the substantially columnar mass of reaction mixture and permit complete reaction of the hydrocarbon therein to form carbon black. In practice, the formation zone will commonly have a length greater than its diameter and more commonly a length of about 2 to 6 times its diameter.

After the aerosol has been removed from the formation zone 1 through outlet 12, it may be cooled by means of a water quench and then passed to cyclone separators, a bag filter, or the like for separation of the carbon black from the gases.

Before presenting specific operating examples of the present invention it is appropriate to describe the test methods used to determine the dispersion and platewear properties of carbon black.

A quantitative test has been developed whereby dispersion can be expressed by means of a Comprehensive Dispersion Rating, referred to hereinafter as CDR. In performing the test, two dispersion rating instruments are employed, similar in performance but providing results which differ in magnitude. One instrument is known as the NPIRI gauge. It is a flat elongated steel bar having parallel channels approximately one inch wide and eight inches in length inscribed in the flat face of the steel bar. The channels are tapered so that there is a uniform change in the depth of the channels from $1/1000$ inch at the deepest end to zero depth at the other end.

The second instrument is similar and is referred to as the Production Club, or PC gauge. Like the NPIRI gauge it is an elongated steel bar having parallel channels inscribed in the flat face of the bar. The channels of the PC gauge, however, are ½ inch wide and about six inches long, uniformly changing in depth from 4/1000 inch to zero depth. The channels of both instruments have index lines adjacent to the channels which subdivide the channels into ten segments of equal length. The operational procedures are essentially identical for each instrument. A sample of an ink paste is placed at the deep end of one channel. At the same position in the other channel is placed a sample of another ink paste, usually a reference standard. A scraper blade resting on the flat face of the instrument, simultaneously moves both ink samples from the deep end of the gauge channels toward the shallow end. After the scraper blade has traveled the length of the instrument, the excess ink has been removed, leaving films of ink in both channels, the thickness of the films coinciding with the depth of the channel.

The visual appearance of the ink films can range from a smooth glossy surface to a dull sandy scratched surface depending on the degree of dispersion of the pigment within the ink vehicle. Ideally, the entire film would be smooth and glossy, indicating perfect dispersion. In practice, however, it is observed that the smooth glossy surface will characterize the deeper channel position while at the more shallow positions, where the ink films are relatively thin, small aggregates of undispersed pigment impart sandiness while larger aggregates which cannot pass under the scraper blade cause a scratched surface in the film. Thus, by comparing the appearance of the films, a skilled technician can readily determine which has the better dispersion. The degree of difference, however, is quite subjective and does not allow one to readily compare a number of ink samples with a meaningful rating assigned to each. To overcome this problem a system of numerical ratings have been developed which assigns quantitative values to the visual elements of dispersion. Such a system employs the following equation to determine the final rating.

$$CDR = 0.4[250 - (N_1 + N_2 + N_3 + N_4 + P)]$$

In the above equation, symbolic representations are,

CDR: Comprehensive Dispersion Rating
$N_1$: Channel depth (in microns) where four scratches are first observed.
$N_2$: Channel depth (in microns) where ten scratches are first observed.
$N_3$: Average sandiness intensity between 10 and 25 microns channel depth.
$N_4$: Average sandiness intensity between 0 and 10 microns channel depth. (Note: Sandiness intensity is determined by comparison with fixed visual standards.)
P: Channel depth (in microns) where sandiness first appears.

Values represented by N are taken from ink films on the NPIRI gauge while values indicated by P are taken from films on the PC gauge.

The values derived from the above equation range from 0–100 for the CDR, the value of 100 representing perfect dispersion.

All ink pastes are prepared on a conventional laboratory 3-roll mill with roll pressures of 300 p.s.i. Samples are passed through the mill three times, dispersion characteristics being determined after each pass. It should be emphasized at this point that no dispersing agents are added to the vehicle or carbon black either before or during the milling procedure.

As previously indicated, the carbon blacks of the present invention display platewear characteristics markedly superior to conventional furnace carbon blacks. When testing carbon black for potential use in printing ink, platewear is a significant determinant in acceptance or rejection of the candidate black. To perform the platewear test inks are mixed on a laboratory 3-roll mill. Felt strips are attached to a flat table surface and 15 grams of ink spread evenly on each felt strip. Printing plate test sections, chrome surfaced electrotype plates approximately 1⅝" x 1 1/16" are washed in naphtha, dried and weighed, then mounted on a test machine designed to move the plates along the ink filled felt strips. The machine is set to provide 75 strokes per minute for 12 hours. Every 3 hours an additional 3 grams of ink are placed on the felt strip. After 12 hours the test plates are removed from the test machine, washed in naphtha, dried and weighed. The weight loss of the plate is determined. The loss in weight is compared to the loss of a plate representing a reference standard ink, the final platewear being expressed as a percentage of the reference ink.

In the following examples the hydrocarbon feedstocks were petroleum residue oils having the following typical analysis:

| | |
|---|---|
| API gravity | 0.2 |
| Viscosity: | |
| SSU—130° F. | 594 |
| SSU—210° F. | 67 |
| Molecular weight | 295 |
| Index of refraction | 1.648 |
| Percent sulfur | 1.06 |
| Percent ash | 0.003 |
| Percent carbon | 90.74 |
| Percent hydrogen | 8.42 |
| Percent benzene insoluble | 0.039 |
| Percent asphaltenes | 0.05 |
| Average boiling point, ° F. | 790 |
| UOP K factor | 10.0 |

EXAMPLE 1

A vertically disposed furnace generally as shown in FIG. 1 was employed. The carbon black formation zone had a diameter of 18 inches and a length of 6 feet. The choke had a diameter of 4.5 inches and a length of 8 inches. Preheated air at 800° F. was passed to the combustion chamber at the rate of 30,000 s.c.f.h. while natural gas was introduced at the rate of 2000 s.c.f.h. The mixture of air and fuel was burned to produce hot combustion gases which were mixed with the feedstock hydrocarbon to form a reaction mixture which was injected through the choke into the carbon black formation zone as a substantially columnar mass. The feedstock hydrocarbon was sprayed into the choke as an atomized spray of liquid droplets at a rate of 42 g.p.h. (60° F.) 0.04 lb. of potassium hydroxide was dispersed in each gallon of the feedstock as a structure control additive. Water, at the rate of about 30 g.p.h., was sprayed into the carbon black formation zone from a point located about 7.5 feet downstream of the choke exit, the water spray being located on the center line of the furnace and directed toward the choke.

The resultant carbon black is shown in comparison to a reference black produced in accordance with a prior art oil furnace process wherein the reaction mixture spiraled and was passed as an expanding conical mass from an 8 inch choke into a formation zone having a diameter of 11 inches and a length of about 10 feet.

| | Reference | Example I |
|---|---|---|
| Carbon black properties: | | |
| Tinting strength, percent FF | 134 | 135 |
| Dibutylphthalate absorption, cc./100 gm | 56 | 59 |
| Iodine adsorption, ASTM | 109 | 110 |
| Ink properties (10% carbon in isophthalic alkyd): | | |
| CDR—Pass 1 | 54 | 62 |
| CDR—Pass 3 | 74 | 82 |

As can be seen, the reference black and the black of Example I have essentially the same particle size, structure and surface area characteristics, but the black of Example I is superior in dispersion to the reference black. It should be pointed out that none of the blacks shown in these examples was subjected to any form of mechanical after-treatment such as pulverization or fluid energy milling.

CDR values for Pass 1 are indicative of the rate of dispersion, the higher value representing a faster rate. Pass 3 values indicate the degree of dispersion which can be ultimately expected in the finished ink mix. It is significant that the differences between the reference and experimental samples are persistent during both Pass 1 and Pass 3. Frequently a carbon black may show a rapid rate of dispersion as indicated by Pass 1 values but on subsequent passes will show only small improvement resulting in no advantage after Pass 3. In the above example, however, it will be noted that the carbon blacks of the present invention are superior in both rate and degree of dispersion.

EXAMPLE II

A vertically disposed furnace the same as in Example I was employed except that the carbon black formation zone had a diameter of 33 inches instead of 18 inches. Preheated air at 800° F. was passed to the combustion chamber at the rate of 63,000 s.c.f.h. while natural gas was introduced at the rate of 4200 s.c.f.h. The mixture of air and fuel was burned to produce hot combustion gases which were mixed with the feedstock hydrocarbon to form a reaction mixture which was injected through the choke into the carbon black formation zone as a substantially columnar mass. The feedstock hydrocarbon was sprayed into the combustion chamber as an atomized spray of liquid droplets at a rate of 102 g.p.h. (60° F.). 0.015 lb. of potassium hydroxide was dispersed in each gallon of the feedstock as a structure control additive. Water, at the rate of about 48 g.p.h. was sprayed into the carbon black formation zone from a point located about 7.5 feet downstream of the choke exit, the water spray being located on the center line of the furnace and directed toward the choke. During the experiment, the temperature within the combustion chamber was about 2800° F., while the temperatures in the top, middle and bottom of the formation zone were about 2050° F., 2010° F., and 1960° F. respectively, the measurements being taken near the wall of the formation zone.

The resultant carbon black is shown in comparison to a reference black which was produced on the same furnace and in the same manner as the reference black of Example I.

|  | Reference | Example I |
|---|---|---|
| Carbon black properties: |  |  |
| Tinting strength, percent FF | 134 | 134 |
| Dibutylphthalate abs., cc./100 gm | 66 | 68 |
| Iodine adsorption, ASTM | 109 | 106 |
| Ink properties (20% carbon in isophthalic alkyd): |  |  |
| CDR—Pass 1 | 49 | 62 |
| CDR—Pass 3 | 64 | 84 |

EXAMPLE III

The furnace of Example II was used while employing the following conditions. Preheated air at 180° F. was passed to the combustion chamber at the rate of 70,000 s.c.f.h. while natural gas was introduced at the rate of 3890 s.c.f.h. The mixture of air and fuel was burned to produce hot combustion gases which were mixed with the feedstock hydrocarbon to form a reaction mixture which was injected through the choke into the carbon black formation zone as a substantially columnar mass. The feedstock hydrocarbon was sprayed into the combustion chamber as an atomized spray of liquid droplets at the rate of 54 g.p.h. (60° F.). 0.033 lb. of KOH was dispersed in each gallon of the feedstock as a structure control additive. Water, at the rate of about 55 g.p.h. was sprayed into the carbon black formation zone from a point located about 3 inches downstream of the choke exit, the water spray being located on the center line of the furnace and directed away from the choke. During the experiment, the temperature within the combustion chamber was about 2220° F., while the temperatures in the top, middle and bottom of the formation zone were about 2240° F., 2200° F. and 1980° F. respectively, the measurements being taken near the wall of the formation zone.

The resultant carbon black is shown in comparison to a reference black which was produced on the same furnace as was employed for making the reference black of Example I, the reaction mixture having a somewhat different composition and temperature for production of a finer black.

|  | Reference | Example III |
|---|---|---|
| Carbon black properties: |  |  |
| Tinting strength, percent FF | 143 | 141 |
| Dibutylphthalate abs., cc./100 gm | 58 | 60 |
| Iodine ads., ASTM | 190 | 167 |
| Ink properties (15% carbon in isophthalic alkyd): |  |  |
| CDR—Pass 1 | 42 | 64 |
| CDR—Pass 3 | 56 | 79 |

EXAMPLE IV

The furnace of Example II was used while employing the following conditions. Preheated air at 800° F. was passed into the combustion chamber at the rate of 41,500 s.c.f.h. while natural gas was introduced at the rate of 2300 s.c.f.h. The mixture of air and fuel was burned to produce hot combustion gases which were mixed with the feedstock hydrocarbon to form a reaction mixture which was injected through the choke into the carbon black formation zone as a substantially columnar mass. The feedstock hydrocarbon was sprayed into the combustion chamber as an atomized spray of liquid droplets at the rate of 84 g.p.h. (60° F.). 0.004 lb. of KOH was dispersed in each gallon of the feedstock as a structure control additive. No cooling water or other cooling agent was injected into the carbon black formation zone during the experiment. The temperature within the combustion chamber was about 2460° F., while the temperature throughout the formation zone was below about 1500° F., but not lower than about 1300° F.

The resultant carbon black is shown in comparison to a reference black which was produced on the same furnace as was employed for making the reference black of Example 1, the reaction mixture having a somewhat different composition and temperature for production of a coarser black.

|  | Reference | Example IV |
|---|---|---|
| Carbon black properties: |  |  |
| Tinting strength, percent FF | 101 | 110 |
| Dibutylphthalate abs., cc./100 gm | 80 | 76 |
| Iodine ads., ASTM | 60 | 58 |
| Ink properties (20% black in isophthalic alkyd): |  |  |
| CDR—Pass 1 | 57 | 72 |
| CDR—Pass 3 | 71 | 94 |

EXAMPLE V

The furnace of Example II was used while employing the following conditions. Preheated air at 400° F. was passed to the combustion chamber at the rate of 58,000 s.c.f.h. while natural gas was introduced at the rate of 3220 s.c.f.h. The mixture of air and fuel was burned to produce hot combustion gases which were mixed with the feedstock hydrocarbon to form a reaction mixture which was injected through the choke into the carbon black formation zone as a substantially columnar mass. The feedstock hydrocarbon was sprayed into the combustion chamber as an atomized spray of liquid droplets at the rate of 105 g.p.h. (60° F.). 0.014 lb. of KOH was dispersed in each gallon of the feedstock as a structure control additive. No cooling water or other cooling agent was injected into the carbon black formation zone. The temperature within the combustion chamber was about 2300° F., while the temperatures in the top, middle and bottom of the formation zone were about 1930° F., 1900° F. and 1800° F. respectively, the measurements being taken along the wall of the zone.

The resultant black is shown in comparison to the reference black of Example IV.

|  | Reference | Example V |
|---|---|---|
| Carbon black properties: | | |
| Tinting strength, percent FF | 101 | 119 |
| Dibutylphthalate abs., cc./100 gm | 80 | 57 |
| Iodine, ASTM | 60 | 63 |
| Ink properties (25% black in isophthalic alkyd): | | |
| CDR—Pass 1 | 64 | 68 |
| CDR—Pass 3 | 76 | 86 |

Examples II, III, IV and V were prepared on the same furnace and demonstrate the persistence of superior dispersing and platewear characteristics regardless of the type of carbon black produced. The resultant carbon blacks have average arithmetic mean particle size diameters ranging from about 18 to about 33 millimicrons. Furthermore, a comparison of Evamples I and II reveals the versatility of the present process but when using furnaces of different dimensions but which nonetheless conform to the operating conditions prescribed herein.

In addition to displaying superior dispersing properties in printing ink vehicles, the carbon blacks of the foregoing examples also exhibit marked improvement in platewear which persists throughout the different general types. This is illustrated by the following tabulation in which the carbon blacks of the previous examples are compared to their respective reference blacks for platewear ratings.

TABLE I

|  | Percent carbon in Ink | Percent platewear (flash-dry vehicle system) |
|---|---|---|
| Carbon black: | | |
| Reference II | 26 | 100 |
| Example II | 26 | 57 |
| Reference III | 25 | 100 |
| Example II | 25 | 89 |
| Reference IV | 25 | 100 |
| Example IV | 25 | 25 |
| Reference V | 20 | 100 |
| Example V | 20 | 52 |

The reduced platewear values for the products of the present invention, coupled with dispersion values earlier shown, clearly demonstrates the important combination of characteristics of the present invention.

In the preceding examples, inks were prepared by milling the carbon black into an isophthalic alkyd vehicle. However, the improvements are not restricted to a specific ink vehicle, since similar improvements have been demonstrated in linseed oils, linseed modified alkyd systems, and quickset ink formulations.

EXAMPLE VI

The furnace apparatus used in preparing the previously described carbon blacks was designed to impart an in-line flow to the components within the combustion chamber, and, consequently, to the reaction mixture leaving the choke. Furthermore, in the preceding examples the feedstock hydrocarbon was injected either into the hot gases within the combustion chamber or the coke.

Figure 4:
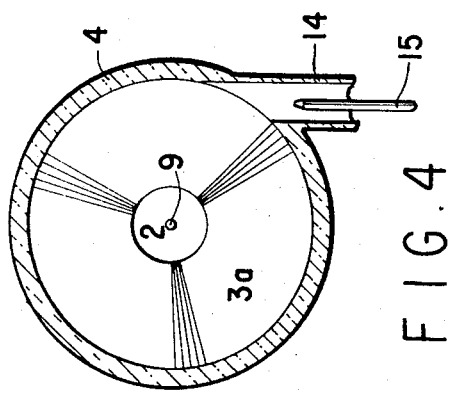
FIG. 4 is a vertical sectional view of FIG. 3 along the line 2—2.

In the present experiment, the furnace had a combustion chamber similar to that shown in FIGS. 3 and 4 of the drawings. The carbon black formation zone had a diameter of 78 inches and a length of 93 inches. The choke was 5 inches in diameter and 4 inches long. Preheated air at 800° F. was fed to the combustion chamber at the rate of 45,000 s.c.f.h. while natural gas was introduced at the rate of 3,450 s.c.f.h. The mixture of air and fuel was burned to produce hot combustion gases which were mixed with the feedstock hydrocarbon to form a reaction mixture which was projected through the choke into the carbon black formation zone. The feedstock hydrocarbon was injected into the carbon black formation zone, from a point 2 inches downstream of the choke, as an atomized spray of liquid droplets at the rate of 39 g.p.h. (60° F.). 0.04 lb. of KOH was dispersed in each gallon of the feedstock as a structure control additive. Water, at the rate of about 48 g.p.h. was sprayed into the carbon black formation zone from a point located about 8 feet downstream of the choke exit, the water spray being located on the center line of the furnace and directed toward the choke.

The resultant carbon black is shown in comparison to a reference black which was produced on the same furnace and in the same manner as the reference black of Example I.

|  | Reference | Example VI |
|---|---|---|
| Carbon black properties: | | |
| Tinting strength, percent FF | 134 | 135 |
| Dibutylphthalate abs. cc./100 gm | 56 | 58 |
| Iodine ads., ASTM | 109 | 93 |
| Ink properties (20% carbon in isophthalic alkyd): | | |
| CDR—Pass 3 | 74 | 86 |

EXAMPLE VII

The products of the present invention may be used directly in general purpose ink systems or may be chemically treated for special applications. One special application is in ink systems generally referred to as "long flow" types. These inks, as their description indicates, are characterized by low viscosity and yield value at high carbon concentrations. Flow properties may be indicated by the distance an ink will flow down an inclined plane in the a given period of time. Generally, furnace blacks do not function ideally as pigments for long flow inks due primarily to high viscosity effects, but with after treatment to modify surface properties they become excellent pigments for this application. One method for after treatment of carbon black with ozone has been described in U.S. Pat. No. 3,245,820.

The furnace of Example II was used to prepare a carbon black for after treatment with ozone. Preheated air at 800° F. was fed to the combustion chamber at the rate of 30,000 s.c.f.h. while natural gas was introduced at the rate of 2,000 s.c.f.h. The mixture of air and fuel was burned to produce hot combustion gases which were mixed with the feedstock hydrocarbon to form a reaction mixture which was projected through the choke into the carbon black formation zone as a substantially columnar mass. The feedstock hydrocarbon was sprayed into the choke as an atomized spray of liquid droplets at a rate of 37 g.p.h. (60° F.) 0.03 lb. of KOH was dispersed in each gallon of the feedstock as a structure control additive. Water, at the rate of about 30 g.p.h. was injected into the formation zone from a point located about 7.5 feet downstream of the choke exit, the water spray being located on the center line of the furnace and directed toward the choke. During the experiment, the temperature within the combustion chamber was about 2000° F., while the temperatures in the top, middle and bottom of the formation zone were about 2140° F., 2060° F. and 1940° F. respectively, the measurements being taken near the wall of the formation zone.

The resulting carbon black was compared to a long flow black prepared by ozone treatment of an oil furnace black produced in a similar manner as the reference black of Example I. Comparison was made between the reference black, the product of Example VII, and the product of Example VII after treating with ozone at a ratio of 16 parts carbon black to 1 part ozone.

|  | Reference | Example VII | Example VII plus ozone |
|---|---|---|---|
| Tinting strength | 132 | 135 | |
| DBP | 56 | 77 | |
| CDR—Pass 1 | 50 | 69 | 66 |
| CDR—Pass 2 | 54 | 80 | 75 |
| Abrasion (percent platewear) | 100 | 50 | 34 |
| Viscosity, poises | 146 | 174 | 151 |
| Flow, inches/15 minutes on 30 degree incline | 7.4 | 2.3 | 6.4 |

Iodine adsorption test data has been omitted from the above because surface volatiles, characteristic of the reference black and treated product of Example VII, seriously invalidates the test as an indicator of surface area.

Thus, it is apparent that products of the present invention may be after treated with ozone, so that when incorporated as ink pigments in long flow systems, they impart desirable long flow and low viscosity while retaining the superior dispersing and abrasive properties.

EXAMPLE VIII

A furnace black with essentially the same particle-size and structure of Example VII, produced on the same furnace at somewhat higher reactant rates is compared below with a normal furnace black and a channel black of equal particle size.

|  | Reference furnace carbon | Reference channel carbon | Example VIII (average 2 tests) |
|---|---|---|---|
| Surface Area, M²/gm. (based on electron micrographs) | 123 | 122 | 124 |
| Platewear, percent | 220 | 100 | 87 |
| CDR—Pass 1 | 46 | 71 | 59 |
| CDR—Pass 3 | 52 | 75 | 80 |
| Viscosity, poises | 271 | 475 | 400 |
| Color | Standard | Grayer | Blacker |

This example is intended to show that the carbon blacks of this invention are improved over standard channel carbons in dispersibility and platewear.

Table II lists the blacks of Examples II, V, VII and IX (the latter being produced in a similar fashion to the black of Example IV) in comparison to a number of currently produced oil furnace blacks. It can be seen that the agglomerate area (Column 5), measured in microns squared per millimeter squared, is considerably less for the carbon blacks of the present invention than those produced in accordance with the prior art. Agglomerate area for each of the blacks was determined as follows:

(1) 6 mg. of the black was placed in a test tube containing 1.5 ml. of chloroform.

(2) The mixture was agitated for 30 seconds in a 40 kc., 100 watt ultrasonic unit containing 1½ inches of water.

(3) 0.3 ml. of the above solution was then added to 1.5 ml. of clean chloroform and agitated again in the ultrasonic unit.

(4) The mixture of step (3) above, was run down a glass slide at a 30 degree angle, one time, using between 0.5 to 0.6 ml. of the solution to cover the full area of the slide.

(5) Three slides each were prepared of each sample and 5 micrographs were taken of each slide. From the fifteen micrographs six representative areas were selected and printed at 400 magnifications.

(6) Each print was measured for agglomerate area per square millimeter with a Zeiss Particle Size Analyzer. The final number shown in Column 5 was the average value obtained from the six areas of step (5).

It can also be seen from Table II that the carbon blacks of Examples V and IX had crystallite $L_c$ values considerably in excess of 15.5 All carbon blacks contain crystallites, which are subgraphitic but planar layers of carbon molecules arranged like graphite, usually 4 to 8 planes thick. The dimensions of the crystallites can be determined by X-ray diffraction, $L_a$ being the length of the crystallite and $L_c$ being the thickness. Directly produced carbon blacks having an $L_c$ dimension in excess of 15.5 have not been produced heretofore, but may be produced by means of the present invention, and have utility as pig-

TABLE II.—PROPERTIES

| Black | 1 | 2 | 3 | 4 | 5 | 6 | 7 | 8 | 9 | 10 | 11 | 1 |
|---|---|---|---|---|---|---|---|---|---|---|---|---|
| Example VII | 13.7 | 207 | 285 | 117 | 49 | 10 | 2.4 | 92 | 159 | 77 | 117 | 135 |
| R 4 | 14.8 | 240 | 302 | 110 | 1,036 | 67 | 4.5 | 59 | 160 | 58 | 109 | 137 |
| U 09 | 13.7 | 198 | 265 | 124 | 1,701 | 93 | 4.8 | 0 | 156 | 50 | 134 | 133 |
| Example V | 16.8 | 293 | 412 | 81 | 156 | 20 | 3.2 | 93 | 143 | 57 | 63 | 119 |
| R 9 | 14.5 | 359 | 527 | 63 | 519 | 69 | 3.1 | 89 | 119 | 50 | 58 | 103 |
| S 9 | 15.1 | 344 | 532 | 63 | 911 | 23 | 7.1 |  | 104 | 79 | 78 | 95 |
| S B | 12.8 | 283 | 377 | 89 | 1,670 | 106 | 4.6 | 76 | 126 | 70 | 64 | 106 |
| R 3 | 13.8 | 280 | 333 | 100 | 877 | 47 | 4.9 | 78 |  |  |  |  |
| U 12 | 13.9 | 359 | 502 | 66 | 10,656 | 609 | 4.7 | 82 | 109 | 65 | 44 | 86 |
| Example II | 14.8 |  |  |  | 36 | 7 | 2.5 |  |  |  |  |  |
| Example IX* | 16.1 |  |  |  | 252 | 31 | 3.3 |  |  |  |  |  |

*Similar to Example IV.

NOTE.—1=Crystallite $L_c$. 2=Arithmetic mean particle diameter in angstroms. 3=Surface mean particle diameter in angstroms. 4=EM surface area in square meters per gram. 5=Agglomerate area, microns squared per millimeter squared. 6=Number of agglomerates per square millimeter. 7=Average agglomerate size in microns. 8=Light microscope dispersion, percent (ASTM). 9=ABC color. 10=Dibutylphthalate abs., cc./100 gm. 11=Iodine ads. ASTM. 12=Tinting strength, percent FF.

ments in printing inks.

Surface mean diameter of the carbon blacks was determined by means of the following equation:

$$D_s = \frac{60,000}{1.83 \times S.A. (EM)}$$

where $D_s$ is the surface mean diameter in angstroms and S.A. (EM) is surface area in square meters per gram as determined by means of an electron microscope.

Therefore, what is claimed is:

1. Oil furnace black having an agglomerate area within the range of about 30 to about 300 square microns per square millimeter, a surface mean particle diameter within the range of about 150 to about 650 angstroms and a dibutylphthalate absorption within the range of about 40 to about 80 cubic centimeters per 100 grams.

2. Oil furnace black as defined in claim 1 and having an $L_c$ crystallite dimension in excess of 15.5 angstroms.

References Cited

UNITED STATES PATENTS

| 3,565,586 | 2/1971 | Kiyonaga | 23—209.4 X |
| 3,235,334 | 2/1966 | Helmers | 23—209.4 |
| 3,010,974 | 11/1961 | Friauf et al. | 23—209.4 |
| 2,890,839 | 6/1959 | Heller | 23—209.1 X |

FOREIGN PATENTS

| 661,057 | 11/1951 | Great Britain | 23—209.6 |

OTHER REFERENCES

Kirk-Othmer Encyclopedia of Chemical Technology (I), vol. 3, 1949, pp. 53–60.

Kirk-Othmer Encyclopedia of Chemical Technology (II), vol. 4, 1964, pp. 243–255.

EDWARD J. MEROS, Primary Examiner

U.S. Cl. X.R.

106—307